UNITED STATES PATENT OFFICE.

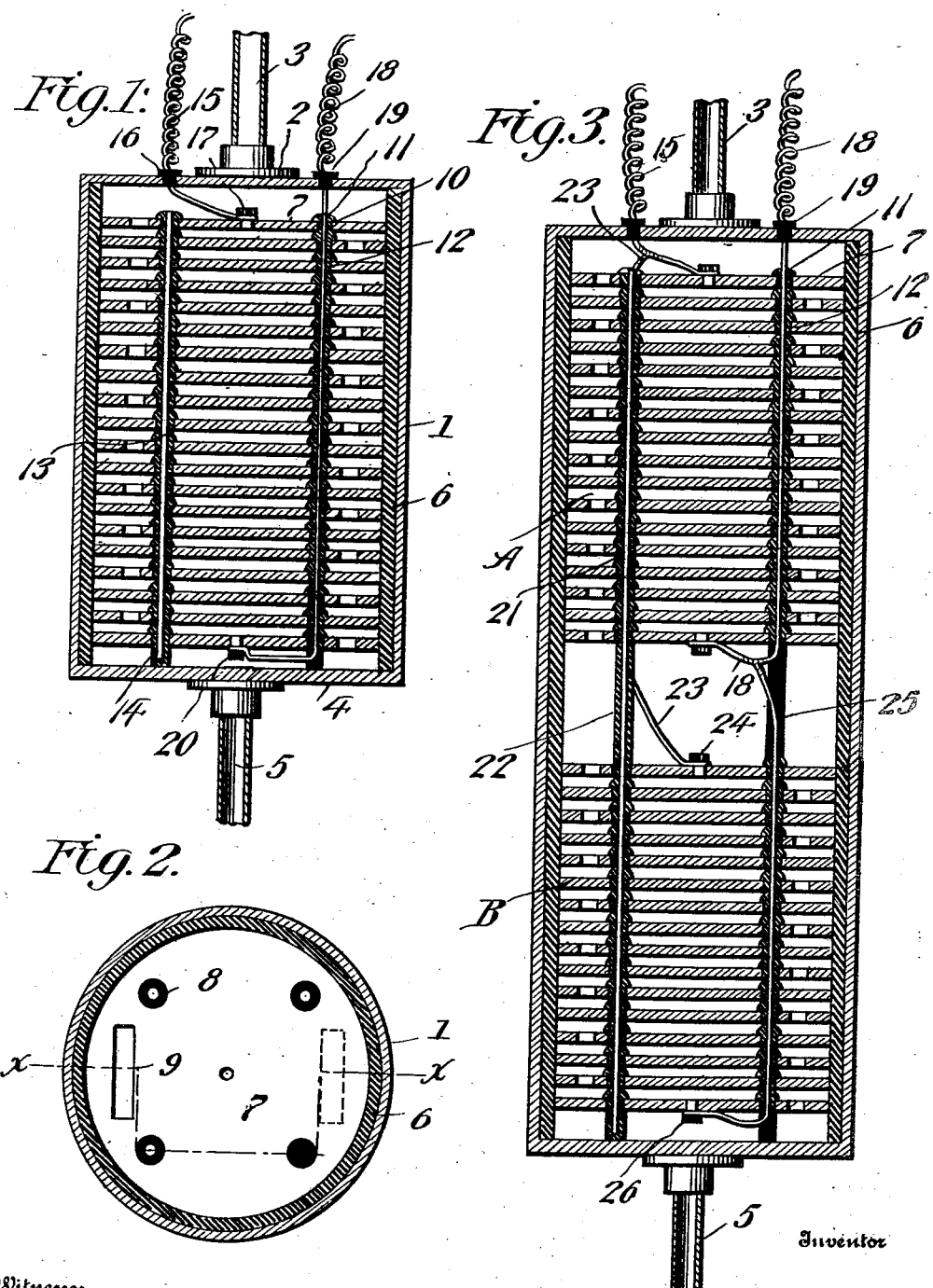

FRANK B. HINKSON, OF NEW CASTLE, PENNSYLVANIA, ASSIGNOR TO HINKSON ELECTRIC LIQUID PURIFYING COMPANY, OF PITTSBURG, PENNSYLVANIA, A CORPORATION OF DELAWARE.

WATER-PURIFIER.

No. 831,434.  Specification of Letters Patent.  Patented Sept. 18, 1906.

Application filed October 7, 1905. Serial No. 281,793.

*To all whom it may concern:*

Be it known that I, FRANK B. HINKSON, a citizen of the United States, residing at New Castle, in the county of Lawrence and State of Pennsylvania, have invented new and useful Improvements in Water-Purifiers, of which the following is a specification.

The invention relates to an improvement in electric water-purifiers, and particularly to an electrolytic device designed for use in connection therewith.

The main object of the invention is to provide a device of the character described that will be effective for the destruction of bacteria and all lower forms of animal and vegetable life contained in the fluid treated without rendering the fluid unpalatable and unwholesome.

To this end the invention contemplates a more effective use of the gases resulting from a decomposition of the fluid by causing increased circulation and agitation of the fluid and the confinement of the gases, whereby comparatively less decomposition is required and in consequence a less quantity of electric current is necessary.

The invention therefore consists, broadly, in a series of closed compartments arranged to successively receive the entire inflow-current of the fluid and each including an electrode, said electrodes being normally insulated from each other and in electrical connection only by and through the electrical conductivity of the fluid, all the electrodes throughout the compartments being energized in series.

Another object of the invention is the provision of means whereby two or more of such devices may be connected in parallel to secure the maximum effect from the current used.

The preferred details of construction and arrangement of parts will be described in the following specification, reference being had to the accompanying drawings, in which—

Figure 1 is a vertical section taken on line *x x* of Fig. 2 through an electrolytic device constructed in accordance with my invention; Fig. 2, a transverse section of the same; and Fig. 3, a similar view to Fig. 1, showing a plurality of the devices connected in parallel.

Referring to the drawings, wherein is shown my improved electrolytic device for use in connection with water-purifiers, 1 represents a cylindrical casing of suitable dimensions, having a top 2, provided with a water-inlet 3, and a bottom 4, provided with a water-outlet 5, all of which parts may be of any usual construction. The wall of the casing 1 is preferably lined by a suitable strip of insulating material 6, of wood or any other desired element.

The electrolytic device proper comprises a series of plates 7, preferably of a size to fit snugly within the casing 1, bearing at their peripheries or edges against the insulating-strip. The plates are identical in construction and by preference are constructed mainly of aluminium combined in suitable quantity with nickel or nickel alloy, though it is to be understood that the use of any material for the plates is contemplated.

Each of the plates is formed with four openings 8, arranged in diametrically opposite pairs and equally spaced from the periphery of the disk, the plate being also provided near its periphery with an elongated opening 9, which may be of any length desired and is preferably located beyond the plane of that portion of the disk bound by the openings 8, as clearly shown in Fig. 2. The walls of the openings 8 are arranged to receive plugs 10, having a head portion 11 and a barrel 12, the plugs being designed to fit snugly into the openings 8, the barrels 12 being shaped for the purpose and being of a length equal to the thickness of the plates, so that when said plug is properly seated the head 11 thereof contacts with and projects above the upper surface of the plate. The plugs 10 are centrally cored for the reception of binding-rods 13, passed longitudinally throughout the series of plates and through the alined plugs, thereby securing the plates together as a whole. The end of the rod projects below the lowermost plate and seats in an insulating-sleeve 14, designed to bear at its lower end on the bottom or lower wall of the casing and support the series of plates in proper relative position.

With each series of plates two rods 13 are preferably used, being arranged to coöperate with diametrically opposite holes 8 in each of the plates, the remaining holes therein being reserved for the electrical connections hereinafter referred to.

In connecting the plates to provide the desired series by the use of rods 13 the plates are so arranged that their openings 9 are positioned in staggered order longitudinally of the casing—that is, the opening in one plate will be located in the casing diametrically opposite the opening in the plate above and below it. As these openings 9 afford the only passage for the water longitudinally of the casing, it follows from this arrangement that the current is compelled to travel a tortuous course to reach the outlet—that is, through one of the openings 9 and on to the plate below, then transversely of the casing to the opening in said plate, and so on throughout the series of plates, thereby providing for an increased electrolytic effect on the water, which is successively made the only connector for the current to pass from plate to plate. The relative position of the openings the plates with respect to each other and to the cylindrical wall of the casing causes a swirling action upon the water, thereby increasing its circulation over the plates.

When the plates are assembled and connected through the medium of rods 13, each plate will be supported by the head 11 of the plug 10, secured in the plate below it, so that said heads afford a means for maintaining the plates separated from each other to the desired degree.

The positive or negative conductor 15 from any suitable source of supply is lead through an insulated plug 16, secured in the top of the casing and directly connected to a binding-post 17, secured centrally of the uppermost plate of the series, while the remaining conductor 18 also passes through a plug 19, formed in the top of the casing and extends downward through the alined plugs 10 of the series of plates, utilizing of course one of the series of plugs not used by the rods 13. The terminal of the conductor 18 extends below the lowermost plate of the series and is there connected to a central binding-post 20, secured to said plate. It is frequently desirable that one or more of the electrolytic devices described be connected together to afford cumulative results and lessen the resistance by reason thereof, and when so desired two of said electrolytic devices, as A and B, each constructed exactly similar to the one previously described, are connected through the medium of elongated rods 21, which pass through the alined plugs of the plates of each series, being of a length sufficient to secure both series together. A spacing-sleeve 22, of insulating material, encircles the rods 21 between the lower plate of the upper series and the upper plate of the lower series, thereby holding the series in proper relative positions. To electrically connect the next lower series with the main conductors, I secure a branch 23 to the conductor 15 and lead the same through the fourth or normally unoccupied series of alined plugs in the electrolytic device and terminally connect said branch with a binding-post 24, secured to the upper plate of the second series of electrolytic plates. The remaining conductor 18 is also connected to this series by a branch 25, leading therefrom below the lower plate of the upper series and extending through one of the unoccupied series of alined plugs in the lower electrolytic device, being terminally connected to a binding-post 26, secured to the lowermost plate of the second series. By continuing this arrangement of parts any number of series desired may be electrically connected.

It will be noted that the heads of the plugs afford the sole medium of separation of the plates and that said heads are to be of a size to properly space the plates in accordance with the nature and strength of the current used, as the use of an alternate current requires a greater distance between the plates than does the direct current for effective operation of the plates.

In use the water is compelled to travel a tortuous passage throughout the length of the electrolytic chamber, being in contact with the successive plates practically throughout their area and at all times subjected to the action of the electric current which travels from the lowermost plate to the uppermost plate through the water and bipolar electrodes, thereby providing for the electrolytic decomposition of the water to the extent of removing the impurities therefrom.

It is obvious that the current is automatically cut off except when water is passing through the casing, therefore providing for the most economic use of the current, as no circuit is completed except during the passage of the water. In this connection it is to be observed that the plates 7 in the arrangement described provide with the casing 1 a series of vertically-arranged closed chambers and that in the use of the device said plates form bipolar electrodes.

It is to be noted that the salient feature of the present invention is the economic and effective utilization of the gases decomposed by electrolytic action, all detailed features of construction tending to this end. In the first place I gain a plurality of successive treatments of the water by virtue of passing the same in succession over a series of electrodes. Furthermore, I utilize the generated gases to their full capacity for the destruction of the bacteria and resaturate the fluid by the excess of such gases, all of which is mainly dependent upon the closed chambers, in which the electrolytic action occurs, as the gases are thereby effectively confined and compelled to the maximum effective action. Again, the successive reversals of the current in its passage through the successive chambers is an efficient aid to the proper decomposition of the water and the effective action of the gases, as such reversal, coupled with the fact that the preferable form of casing is cylindrical, induces a swirling action upon the body of fluid with the result to materially increase the agitation with the results above noted. The electrodes are normally insulated from each other and are only electrically connected by the body of fluid passing therebetween, and when so electrically connected said electrodes are energized in series.

By virtue of the closed compartments the electrodes are in electrical connection solely by the fluid, and the arrangement by which the entire body of water is brought into successive contact with the electrodes enables me to provide a filter which is capable of the maximum germicidal effect from the minimum generation of the gases, so that the utilization of the relatively small current strength is necessary, The comparatively slight decomposition and the resaturation of the water with the liberated gases after their utilization as germicides enables me to produce a wholesome palatable fluid, requiring neither aeration or other of the usual treatments.

Having thus described my invention, what is claimed as new is—

An electrolytic device for purifiers comprising a plurality of closed compartments arranged in a vertical series and adapted to successively receive the inflow-current of the fluid to be purified, said compartments being separated by bipolar electrodes, and terminal electrodes adapted for connection to a source of current.

In testimony whereof I affix my signature in presence of two witnesses.

FRANK B. HINKSON.

Witnesses:
 JOHN L. FLETCHER,
 A. M. LANGLEY.